Oct. 10, 1972  W. L. MACKIE  3,697,422
INTUMESCENT FILLERS FOR PAINTS
Filed Nov. 23, 1970
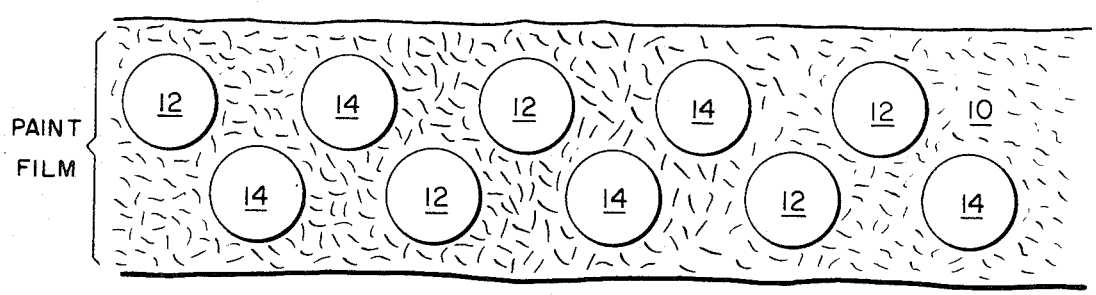
WILLIAM L. MACKIE
INVENTOR
BY
ATTORNEYS

United States Patent Office 3,697,422
Patented Oct. 10, 1972

3,697,422
INTUMESCENT FILLERS FOR PAINTS
William L. Mackie, Ventura, Calif., assignor to the United States of America as represented by the Secretary of the Navy
Filed Nov. 23, 1970, Ser. No. 92,185
Int. Cl. C09d 5/18; C09k 3/28
U.S. Cl. 252—8.1      3 Claims

ABSTRACT OF THE DISCLOSURE

A conventional anti-corrosion paint composition containing a mixture of microspheres some of which contain a foamable plastic material while others contain a spumific material. In the event that a surface coated with this formulation is exposed to heat, the microspheres will melt causing an intermingling of their contents which will produce gas. Such gas causes the other liquids released by the ruptured microspheres to swell and foam creating a non-flammable insulative barrier.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the invention

The present invention relates to paint formulations having intumescent capabilities and more particularly to anti-corrosive paints in which is incorporated a mixture of microspheres encapsulating ingredients which when ruptured will create a non-flammable barrier.

(2) Description of the prior art

There are numerous intumescent, fire retardant and heat insulative paint formulations in the prior art. One such formulation is shown in U.S. Pat. 2,862,834 to M. J. Hiler and discloses a coating composition containing beads of polystyrene and a foaming or blowing agent. The blowing agent is not in the form of microspheres. When the coating is subjected to heat, the foamable beads expanded to form a pleasing surface effect which might conceivably be employed as a fire retardant.

Another means for the extinguishment of flames is shown in U.S. Pat. 3,058,929 to Vanderhoff et al. The composition which is formed from a foamable resin, blowing agent, and an anti-flame agent acts to extinguish a flame by the flame-proofing agent and not by the action of the foaming agent.

An inherent disadvantage in many prior art intumescent fire retardant formulations is that they may not be employed for both suppression or reduction of corrosion in addition to any fire retardant characteristics.

SUMMARY OF THE INVENTION

The present invention comprises a fire retardant composition and method of making the same wherein a mixture of microspheres containing a foamable plastic material and a spumific are incorporated in a conventional anti-corrosive paint formulation.

Exposure of a surface coated with the formulation to heat ruptures the microspheres and effect an intermingling of their contents which produces gas. The formation of such gas causes the remaining ingredients released by the ruptured microspheres to swell and foam, creating a non-flammable and heat insulative barrier.

STATEMENT OF THE OBJECTS OF THE INVENTION

Accordingly, it is an object of the present invention to provide a novel heat insulating intumescent filler for any anti-corrosive paint formulation.

Another object is to provide a mixture of heat susceptible microspheres containing a foamable plastic and a spumific as an additive to a conventional anti-corrosive paint formulation.

Still another object is to provide a novel method of increasing the heat insulation properties of conventional anti-corrosive paint formulations.

Other objects, advantages and novel features of the invention will become apparent from the following detailed description of the invention when considered in conjunction with the accompanying drawing wherein:

BRIEF DESCRIPTION OF THE DRAWING

The drawing is a greatly enlarged diagrammatic view of the paint formulation showing the mixture of microspheres therein.

DESCRIPTION OF THE PREFERRED EMBODIMENT

The invention as shown in the drawing comprises a novel fire retardant composition and method of making the same wherein a conventional paint substrate 10, preferably an anti-corrosion paint subtrate, has incorporated therein an intumescent filler, thus ensuring that any coating of the paint substrate 10 will possess both anti-corrosive and heat insulative capabilities.

The intumescent filler includes the encapsulation of both a foamable plastic material and a spumific in separate heat susceptible microspheres 12 and 14 respectively.

The mixture of microspheres 12 and 14 is blended within the paint substrate 10 in about a 50—50 ratio and as a substrate additive includes about 30 to 40% of the weight of the paint formulation.

Exposure to heat of a surface coated with the thus described formulation melts or ruptures the microspheres causing intermingling of their contents which produces gas. Such gas formation causes the remaining liquids released by the ruptured microspheres to swell and foam thereby creating a non-flammable insulative barrier over the coated surface.

The foamable plastic within microspheres 12 may include any suitable material but preferably phenol-formaldehyde, polyurethane and polyester compounds which may be treated with an anti-flammable compound to reduce flammability. The spumific within microspheres 14 may also include numerous compounds employed for this purpose but preferably polymethylene polyphenylisocyanate. It is emphasized that no patentable significance is attached to the various foamable plastics or spumifics used but only to the intumescent microspheres 12 and 14 incorporated in the paint substrate which have therein such compounds.

The invention may be further illustrated by the following example:

EXAMPLE

| Ingredient: | Percent by weight |
|---|---|
| Titanium dioxide | 19.55 |
| Alkyd resin [1] | 22.30 |
| Vinyl resin [2] | 8.94 |
| Methyl isobutyl ketone | 44.70 |
| Xylene | 4.47 |
| Lead naphthenate drier | 0.0002 |
| Cobalt naphthenate drier | 0.0001 |
| Manganese naphthenate drier | 0.0001 |
| | 99.9640 |

[1] Premised upon use of vinyl resin compatible with amount of mineral spirits thus added to other solvents specified.
[2] Vinyl acetate-vinyl chloride copolymer; 89.5-91.5% vinyl chloride, 5.3-7.0% vinyl alcohol, 2.0-5.5 vinyl acetate specific gravity under 1.35.

Pigment 19.0-22.0% by weight, containing not under 92% titanium dioxide; nonvolatile vehicle 24.0-27.0% by weight containing 14-18% phthalic anhydride and 17.0-20.0% chlorine; volatiles 53.0-57.0% by weight; water not over 0.5%; particles retained on a 325 seive not over 0.5%, viscosity 60-67 KU.

Process

Thoroughly mix the above paint formulation in a vibratory paint mixer. Then add approximately 30% by weight of the paint formulation of a 50-50 mixture of encapsulated foamable plastic and spumific material. Thoroughly blend the resulting mixture. In the event the viscosity of the resultant mixture is too high for use in a spray gun, additional xylene or equivalent compound can be blended into the mixture to produce a viable viscosity for application purposes.

The foregoing example employs a weight of microspheres which is about 30% by weight of the complete paint formulation. However, the pigment or filler portion of the paint formulation may be replaced if desired by colored or dyed microspheres 12 and 14 respectively. The object of this variation of the invention is to provide more foam forming microspheres in proportion to the total weight of the paint formulation. This would result in more abundant foam and a greater degree of thermal insulation.

The fabrication of microspheres containing a foamable plastic and a foaming agent might be carried out by the well known technique of emulsifying the foamable plastic and/or the foaming agent in a hydrophilic colloid solution. The pH and temperature are adjusted to produce a liquid phase which encapsulates each drop of plastic or foaming agent. The capsules are then recovered by jelling the capsule wall followed by appropriate drying.

Other well known methods can be used, if desired, to encapsulate the foam components. Thus, pellets of the foam producing ingredients may be coated with gelatin, then vacuum dried to produce the required spheres. However, such spheres, being water soluble, would necessarily have to be over-coated with a water resistant paint to insulate against water.

Obviously many modifications and variations of the present invention are possible in the light of the above teachings. It is therefore to be understood that within the scope of the appended claims the invention may be practiced otherwise than as specifically described.

I claim:

1. A paint formulation having fire retardant capabilities comprising:
  a paint substrate and
  an intumescent filler including a mixture of microspheres incorporated in said paint substrate with the mixture being about 30 to 40% of the weight of the paint formulation, said microspheres encapsulating a foamable plastic material and a spumific substance in separate microspheres blended at a 50-50 ratio; said foamable plastic material selected from the group consisting of phenolformaldehyde, polyurethane and polyester compounds with the spumific substance being polymethylene polyphenylisocyanate; thus exposure of the said formulation to heat will rupture the microspheres and by interaction of the contents of said microspheres create a heat insulative and non-flammable barrier over any surface coated with said formulation.

2. The paint formulation as defined in claim 1 wherein the paint substrate is of the anti-corrosive variety.

3. The paint formulation as defined in claim 1 wherein the pigment portion of the paint substrate is replaced by a mixture of said microspheres having a desired color thus providing to the paint more intumescent microspheres in proportion to the total weight of the paint formulation.

References Cited

UNITED STATES PATENTS

| 3,586,519 | 6/1971 | Hendricks | 106—14 |
| 3,535,130 | 10/1970 | Webb | 252—8.1 X |
| 3,317,433 | 5/1967 | Eichel | 252—7 |
| 3,455,850 | 7/1969 | Saunders | 252—8.1 X |
| 2,797,201 | 6/1957 | Veatch et al. | 260—2.5 R |

MAYER WEINBLATT, Primary Examiner

U.S. Cl. X.R.

106—14, 15 FP; 117—123 D; 260—2.5 R